United States Patent [19]

Miller

[11] Patent Number: 5,106,699
[45] Date of Patent: Apr. 21, 1992

[54] APPARATUS FOR FILLING IN AN OPENING IN A WALL OF A SAFE

[76] Inventor: J. Clayton Miller, 5085 Danville Rd., Nicholasville, Ky. 40356

[21] Appl. No.: 526,139

[22] Filed: May 22, 1990

[51] Int. Cl.$^5$ ............................................. B23P 6/00
[52] U.S. Cl. .................... 428/571; 428/582; 428/583; 428/627
[58] Field of Search ............ 428/571, 572, 573, 582, 428/583, 585, 627

[56] References Cited

U.S. PATENT DOCUMENTS

| | | | |
|---|---|---|---|
| 2,010,569 | 8/1935 | Sitzler | 29/520 |
| 3,066,400 | 12/1962 | Forsythe | 29/402.17 |
| 3,203,479 | 8/1965 | Hindman | 165/134.1 |
| 3,376,118 | 4/1968 | Odenthal | 428/583 |
| 3,831,240 | 8/1974 | Boggs et al. | 29/407 |
| 3,837,066 | 9/1974 | Mori et al. | 428/585 |
| 4,662,806 | 5/1987 | Reed | 411/2 |

*Primary Examiner*—R. Dean
*Assistant Examiner*—George Wyszomierski
*Attorney, Agent, or Firm*—Lowe, Price, LeBlanc & Becker

[57] ABSTRACT

A simple cylindrical steel element, having a tapered portion at an insertion end and a plug of a difficult-to-machine material securely attached therein, is forcibly inserted into a previously formed hole, e.g., in a hard inner layer of a multilayer wall of a safe for containing valuables. To facilitate intromission of the tapered end of the device into the hole, all layers except the hard inner layer are machined to slightly enlarge the hole originally formed therethrough. In the preferred embodiment, markings in the form of regularly spaced circumferential grooves are provided along the length of the device and are readily utilizable to determine where the device should be cut so that, by the application of a sharp force as from a hammer, the tapered end of the device, with the hard-to-machine plug embedded therein, is firmly lodged into the hard inner layer. Welding material is provided thereafter to firmly connect an outer end of the device with the material of an outer layer of the wall.

10 Claims, 3 Drawing Sheets

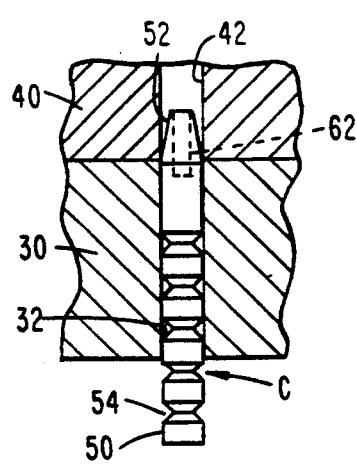
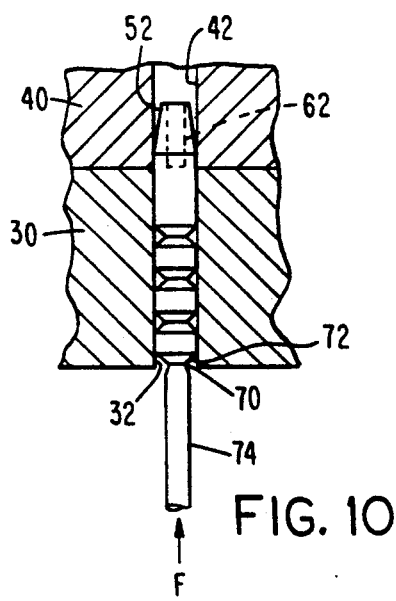
FIG. 9    FIG. 10
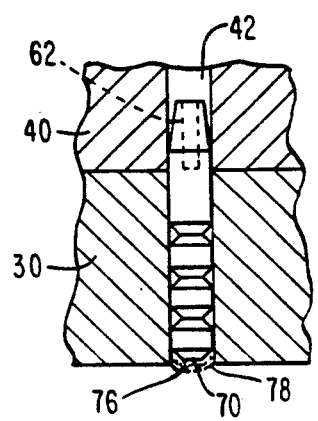
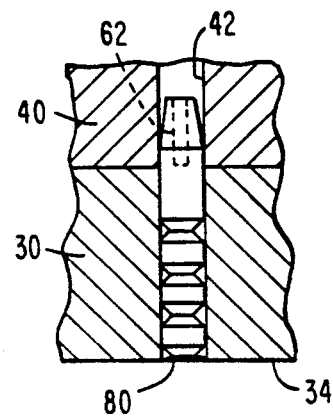
FIG. 11    FIG. 12
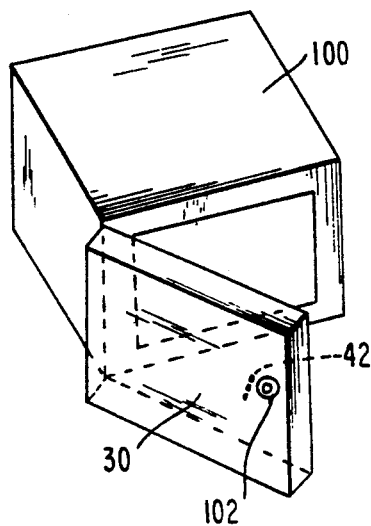
FIG. 13

APPARATUS FOR FILLING IN AN OPENING IN A WALL OF A SAFE

TECHNICAL FIELD

This invention relates to apparatus and methods for preventing reentry into a safe through a hole previously formed therein and to restoration of the integrity of the safe by secure and permanent plugging of the hole.

BACKGROUND ART

Valuables such as jewelry, stocks and bonds, and classified material, are typically stored in safes., Such safes usually have a mechanism that may be actuated by providing a preselected combination to open a combination lock mounted to the door of the safe. Some safes require the use of a key in lieu of or addition to a combination. Unfortunately, sometimes the required combination is forgotten, written and then lost or otherwise unavailable due to the absence of the individual possessing it. Where a key is required to open the safe door, the key itself may sometimes be lost or otherwise unavailable. In such circumstances, an irregular entry, i.e., other than by normal unlocking of the lock mechanism in the door, is usually made by a technician who drills a small hole through the door near the lock and utilizes special tools inserted through the hole to facilitate actuation of the locking mechanism to its open position. Burglars, too, may use such a technique. In either case, typically, a hole approximately ¼" in diameter is drilled through one or more layers forming the thickness of the safe door. A tool is then inserted through the hole to enable visual observation of a tumbler mechanism of the lock or a lock picking tool may be inserted to manipulate the tumblers. Whether the irregular entry into the safe in this manner was effected for justifiable reasons or in the course of a burglary, the physical integrity of the safe must be restored for its future use.

One known technique for restoring safe integrity, when such a hole or access-aperture has been formed therein, is to insert a plug made of a tough weldable material into the hole and to then weld around an outside end of the plug to the outermost wall through which the hole was drilled. A known plug of this type has a slight uniform taper along its entire length, with an insertable end diameter smaller than the original hole diameter in the outer wall, and an outside end having a diameter larger than the hole diameter. This uniformly tapered elongate plug is typically hammered into place, so that it is lodged into the outermost layer of the safe door, and is then welded to the outside of the outermost layer. Unfortunately, entry through the same hole can be made readily by a person applying a drill equal to at least the diameter of the original hole into which the plug is lodged. Once such drilling passes the outside welded portion of the plug, because of the lengthwise taper of the plug, the plug can simply be tapped into the safe and the hole becomes available for reuse enabling access to the safe contents.

Safes for storing particularly valuable materials routinely have multi-layer walls in which the different layers have different properties. For example, the outermost layer of such a safe may be formed of a ½" thick sheet of a tough alloy steel that is not readily cracked even under repeated heavy blows. Such materials, however, can be drilled through with an appropriately selected drill bit. One or more layers of a fire-retardant material may also be provided inside of the outermost tough alloy layer. Further inside the safe, there may be provided a layer of a particularly hard material selected for its inherent tendency to slow down any drilling therethrough. However, to form substantially sized plates of such hard material, some sacrifice in the total hardness of the material becomes necessary. Accordingly, such hard materials do not present an insuperable problem, and can be drilled through by the use of a succession of drill bits selected for drilling through hard materials.

To prevent irregular access by the easy drilling out of the elongate uniformly tapered plug, an improvement consists in forming an axially oriented through-hole in the plug and filling the through-hole with a mixture of a powdered carbide material and powdered brass or the like. The plug is then heated to a point where the powdered brass melts and bonds around the carbide materials and the wall of the through-hole to, hopefully, fill the entire through hole. In principle, such a device should tend to readily blunt most drill bits because the carbide material is extremely hard and difficult-to-machine. A major problem with this approach is that it is very difficult to ensure that the through-hole formed through the plug is uniformly and totally filled with the mixture of carbide material and brass. In practice, voids may be formed within the through-hole of the plug, and it is not possible to readily determine which plugs have such voids and are, therefore, not as effective as desirable.

Reference at this stage may be had to FIGS. 1-3 which illustrate, respectively, an outside elevation, an end elevation, and a longitudinal cross-sectional view of such a known carbide-filled tapered elongate element 20 in place inside a hole drilled through two layers 30, 40 in a wall of a safe. It will be understood that for such an element 20, its overall length $a_1$ and its maximum diameter $d_1$ must be selected such that when a length $a_2$ thereof is inserted as far as possible from the outside of outer layer 30 into a hole of diameter $d_5$, a portion of length $(a_1-a_2)$ remains outside and allows weld material 22 to be deposited therearound. Under ideal circumstances, the through-hole of diameter $d_3$ in element 20 should be completely filled. Unfortunately, the carbide/brass material 24, as best seen in FIG. 3, is not uniformly distributed but has voids 26 formed therein. Voids 26 are exaggerated in size to illustrate them clearly in FIG. 3. The presence of such voids is highly undesirable. As is readily understood from FIG. 3, if a person drills away only to a short distance into thickness $d_0$ of outer layer 30, most of the inserted length of element 20 will simply fall or be readily pushed through access-aperture of diameter $d_5$ through both of layers 30 and 40.

DISCLOSURE OF THE INVENTION

It is a principal object of this invention to provide a device for securely plugging an existing hole in a wall of a safe to prevent access into the safe through that hole.

It is a related object of this invention to securely lodge into a hole in a hard inner layer of a multilayer wall of a safe an element of a difficult-to-machine material to frustrate redrilling through the original hole.

It is a further related object of this invention to restore both the physical integrity and the outward appearance of a safe wall, into which a through hole has been drilled, by forcibly inserting into the hole a tapered weldable element containing a solid difficult-tomachine plug so that the plug is securely lodged inside hard inner layer of the safe wall, the weldable element being cut to be somewhat recessed into the outermost layer of the wall and welding the recessed end of the element to the outermost layer and smoothing off any excess weld metal to generate a smoothly contiguous restored wall surface.

Accordingly, there is provided in a preferred embodiment of this invention a device for securely preventing reentry through a cylindrical hole previously made in a multi-layer wall of a container, the device comprising a substantially cylindrical elongate steel element of predetermined length and a predetermined maximum outside diameter selected to correspond to a diameter of the hole in at least an outermost layer of the wall. An insertion end portion of the element is formed to have a predetermined outside taper ending in a small diameter at a first end of the element, the first end also having formed therein a blind hole of a predetermined hole length and a hole diameter smaller than the small diameter of the element. A solid plug containing a selected material is shaped to closely fit into the blind hole and is securely attached to the element therein. The selected material of the plug preferably is a difficult-to-drill material such as carbide.

In another aspect of this invention, there is provided a restored safe, at least one wall of which comprises an outer layer and a cooperating hard inner layer, a cylindrical hole having being formed into both layers to enable an irregular access from outside the safe to a containment space within the hard inner layer. The restoration of the safe is obtained by providing a small diametral enlargement of the hole in the safe door only along its length through the outer layer, and providing a substantially cylindrical elongate steel element having an outside diameter intermediate in size between the diameter of the original hole through the hard inner layer and the diameter of the enlarged hole formed in the outer layer. The steel element has an insertion end with axial taper of predetermined angle and length and an end diameter smaller than the diameter of the original hole. The tapered insertion end of the element also has a blind hole formed therein and this is securely filled-in with a solid plug comprising a difficult-to-machine material e.g., solid carbide. The element is cut to a length such that when the tapered and plugged end thereof is forcibly driven to be lodged in the hole in the hard inner layer, an outer end of the element is recessed to a short predetermined distance within the slightly larger hole in the outer layer to be welded thereat. Any subsequent attempt to drill out the element for repeated irregular access to the inside of the safe is frustrated by the plug of difficult-to-machine material forcibly lodged into the hole in the hard inner layer. Subsequent to the welding of the inserted element at its recessed end to the outer layer, any surplus weld deposit may be ground or otherwise machined to be smoothly contiguous with the rest of the outer exposed surface of the outer layer to restore the visible appearance of the container wall.

In yet another aspect of this invention, there is provided a method for functionally restoring a safe having at least one wall or door comprising an outer layer and a cooperating hard inner layer with a hole previously formed through both layers to enable access from the outside of the container to a containment space within the hard inner layer. The disclosed method is to prevent further access through the hole, and comprises the steps of enlarging the original hole to a slightly larger diameter only across the corresponding length thereof through the outer layer, forcibly inserting into the hole in the hard inner surface a tapered end portion of an otherwise generally cylindrical steel element passed through the enlarged hole in the outer layer, the tapered end portion containing a solid plug comprising a difficult-to-machine material, and welding an outer end of the steel element to the outer layer to permanently attach the two together with the solid plug securely lodged into the hard inner layer to frustrate subsequent attempts to drill out the element.

These and other related aspects and objectives of the present invention will be readily understood with reference to the following disclosure and the drawings.

BRIEF DESCRIPTION OF THE DRAWINGS

FIGS. 9-12 indicate certain essential steps in the method of using a device according to a preferred embodiment of this invention; and FIG. 13 is a schematic view of a safe, with its door open, to illustrate where a through-hole may be formed in the door to facilitate access to the mechanism for locking the door.

DESCRIPTION OF THE PREFERRED EMBODIMENTS

Figure 4:
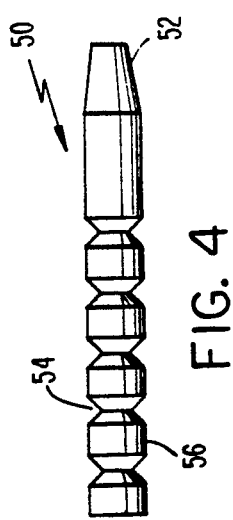
FIG. 4 is a longitudinal elevation view of a preferred embodiment of the device according to the present invention.

As best seen in FIG. 4, the device according to a preferred embodiment of the present invention has a generally cylindrical form about an elongate axis. In practice, such a device could be machined from a steel bar, and may conveniently be 0.25" in nominal diameter. A convenient length, suitable for a majority of office safes, would be 2 inches. Such dimensions may be selected to suit particular needs. Other sizes, e.g., 5/16" or ⅜" diameter, with commensurate changes in the other dimensions may be selected as needed.

Figure 5:
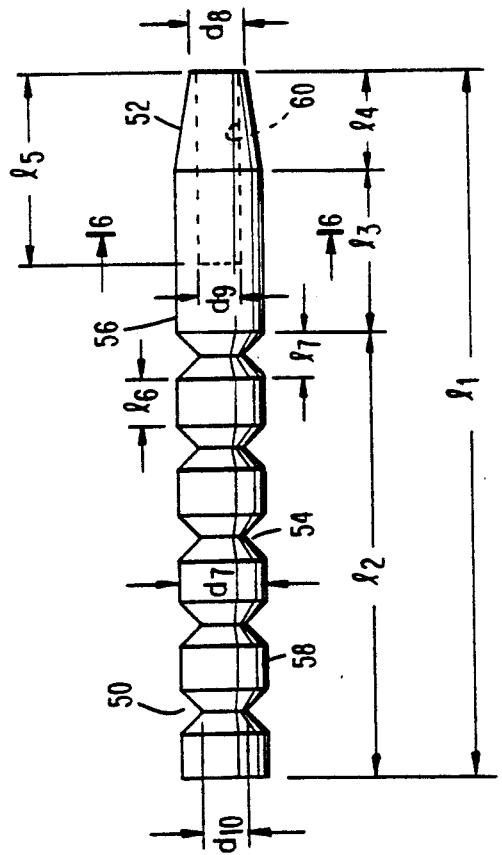
FIG. 5 is a enlarged and more detailed longitudinal elevation view of the device of FIG. 4.

As best understood with reference to FIG. 5, there is provided a tapered portion 52 at an insertion end of the cylindrical element 50. Also provided in a preferred embodiment is a plurality of grooves 54, each preferably having a triangular cross-section with two sloping sides, with adjacent grooves 54 preferably separated along the length of element 50 at distances of ⅛" starting from the untapered end. In the illustration per FIG. 5, five grooves are shown but, depending upon the application, more or less such grooves may be provided for reasons made clearer below.

A short ungrooved length 56 is left between the tapered portion 52 and the next adjacent groove 54. Portions of the original ungrooved stock therefore remain as cylindrical portions 58 separating adjacent grooves.

Figure 6:
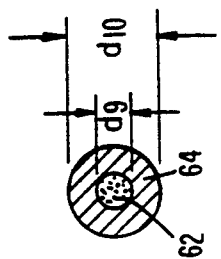
FIG. 6 is a transverse cross-sectional view of the device of FIGS. 4 and 5 at section 6—6 in FIG. 5.

As best understood with reference to FIGS. 5 and 6, a blind hole 60 is formed in the tapered end of element 50. A solid plug 62 of a difficult-to-machine material, e.g., a solid plug of tungsten carbide, shaped and sized to closely fit into blind hole 60 is then silver soldered into blind hole 60, to become securely attached therein. The layer of silver solder plug 62 from the surfaces of blind hole 60, to which it is silver soldered, by the application of an impact force to plug 64 in an axial direction.

As a practical matter, there are certain dimensional considerations, best definable in the following relationships, that must be taken into account:

$$l_1 = l_2 + l_3 + l_4 \quad (a)$$

$$d_7 > d_8 > d_9 \quad (b)$$

$$d_7 > d_{10} \quad (c)$$

$$l_5 < l_3 + l_4 \quad (d)$$

and $$l_5 > l_4 \quad (e),$$

$$l_2 = n(l_6 + l_7)$$

where:

$l_1$ = overall length of element 50;
$l_2$ = length of the grooved portion, containing "n" grooves;
$l_3$ = ungrooved length between the tapered end 52 and the closest groove;
$l_4$ = length of tapered portion 52 in the axial direction of element 50;
$l_5$ = depth of blind hole 60, also preferably close to the length of solid difficult-to-machine plug 62 silver-soldered therein;
$l_6$ = unmachined length between adjacent grooves;
$l_7$ = axially oriented length per groove.

The thickness of a door of the safe, as best understood with reference to FIG. 13, where the hole to be filled by the device of the present invention is located, very likely will be formed of at least one outer layer 30 made of a cold-rolled alloy steel and an inner layer 40 probably made of heat-treated hardened Safes intended to store flammable documents, microfilm, and the like, likely have one or more layers of a fire retardant material between outer layer 30 and hard inner layer 40. For the sake of clarity, such layers are not expressly illustrated in FIGS. 7 and 8.

Figure 3:
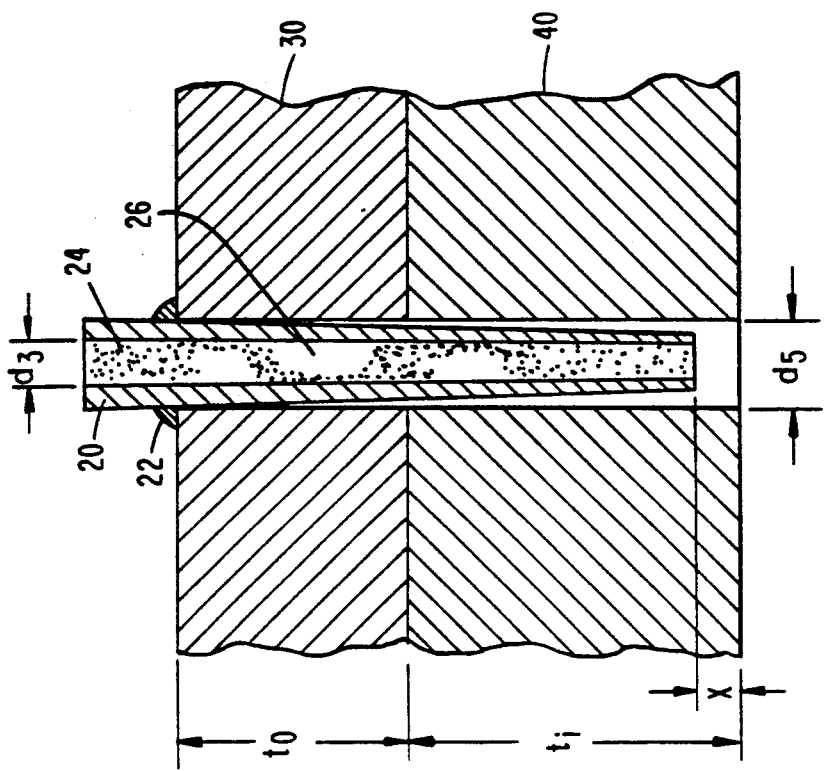
FIG. 3 is a cross-sectional view through a multi-layer wall of a container device along the axis of a known element according to FIGS. 1 and 2, to illustrate known problems with such prior art devices.
Figure 1:
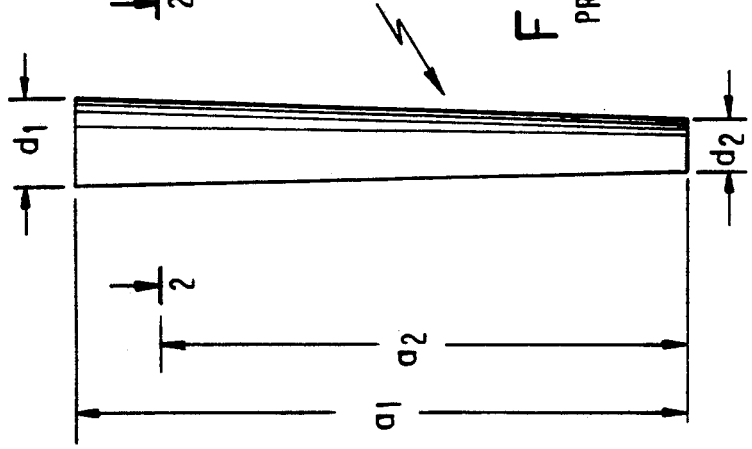
FIG. 1 is a longitudinal elevation view of a known hollow steel plug tapered along its entire length.
Figure 2:
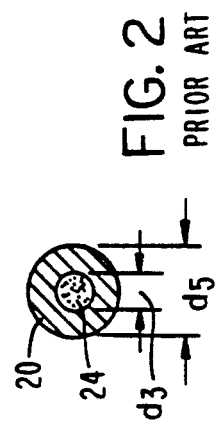
FIG. 2 is a transverse cross-sectional view at section 2—2 of FIG. 1.
Figure 7:
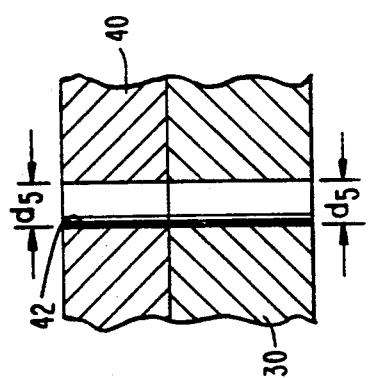
FIG. 7 is a cross-sectional view at a multi-layer wall of a container at the longitudinal axis of a through-hole formed therein.
Figure 8:
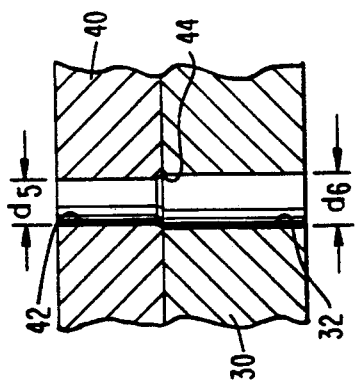
FIG. 8 is a view similar to that of FIG. 7, with that portion of the through-hole that passes through the outer layer slightly enlarged in a diametral dimension.

As best seen in FIGS. 7 and 13, an initial throughhole 42 of diameter $d_5$ is drilled close to a lock 102 in the safe through the wall thickness, i.e., through both the outer layer 30 and hard inner layer 40. Obviously, diameter $d_7$ of steel element 50 should not be smaller than diameter $d_5$ of the original hole 42. Were it to be otherwise, upon destruction of the welded portion at the outside end of element 50, to be described more fully hereinbelow, element 50 could simply be pushed through hole 42. However, if diameter $d_7$ of element 50 is larger than diameter $d_5$ of the original hole the only way that element 50 can be introduced into aperture 42 within the hard inner layer 40 is by the application of an impractically large amount of force. This particular approach is not the focus of the present invention. For practical reasons, therefore, it is necessary to open up the original hole 42 in its extent passing through the thickness of outer layer 30 and through the thicknesses of any intermediate layers provided between outer layer 30 and inner layer 40.

In practice, for proper use of the present invention, a drill is selected to have a diameter capable of producing an aperture with a diameter $d_6$ that is slightly larger than diameter $d_7$ of element 50, e.g. if $d_7 = 0.250''$, $d_6 = 0.270''$. Such a drill is then utilized to generate an enlarged hole 32 for the thickness of outer layer 30 (and any other intermediate layers) of diameter $d_6$. It may be anticipated that when such a drill is used to machine hole 32 in outer layer 30, a slight chamfer 40 may be formed when that drill, of a diameter close to $d_6$, encounters the closest surface of hard inner layer 40. See FIG. 8 for an illustration of this.

The various diameters shown in FIGS. 5–8 must satisfy the following relationships:

$$d_6 > d_7 > d_5 \quad (f)$$

$$d_7 > d_8 > d_9 \quad (g)$$

and $$d_7 > d_{10} \quad (h),$$

where:

$d_5$ = diameter of original access aperture 42 passing through all layers;
$d_6$ = diameter of enlarged aperture in outer layer 30 and any layers provided between outer layer 30 and hard inner layer 40;
$d_7$ = maximum diameter of element 50;
$d_8$ = smallest diameter of tapered insert end portion 52 of element 50;
$d_9$ = diameter of blind hole 60, only slightly larger than diameter of solid plug 62; and
$d_{10}$ = smallest diameter within groove 54 formed in element 50.

The uses of grooves 54 and the device described hereinabove will now be explained with particular reference to FIGS. 9–12.

As best seen in FIG. 9, element 50 is readily pushed into enlarged aperture 32 in outer layer 30 toward hard inner layer 40 because diameter $d_6$ is greater than the maximum diameter $d_7$ of element 50. However, because diameter $d_7$ of element 50 is greater than $d_5$ of the original hole 42, tapered portion 52 will not readily and pass through aperture 42 in hard inner layer 40. As discussed earlier, the process of forming the enlarged hole 32 in outer layer 30 very likely will have generated a slight chamfer 44 in the surface of hard inner layer 40 closest to outer layer 30. If so, it will be helpful.

At this point, the user will make a first specific use of grooves 54 by identifying the groove closest to the outer surface of outer layer 30. This is indicated by the arrow "C" in FIG. 9.

The user will then make a second intended use of the particular groove 54 identified by the arrow "C" by using it as a guide to saw off or otherwise cut or break off element 50 thereat. In other words, although various marks may be painted, scratched, etched, or otherwise provided along the outer surface of element 50, in the preferred embodiment according to this invention such markings take the form of grooves machined into the surface of element 50. This enables a user to very easily remember a particular groove at which the cut is to be made and, then, to also utilize that same groove as a guide for a saw to easily cut element 50 at the reduced diameter thereat.

Upon being thus cut, element 50 will have a somewhat shorter length than its original length $l_1$ and will have a cut end with a circular face 70 having a diameter approximately equal to $d_{10}$ and a conical annular surface cut 72 corresponding to approximately half the surface defining the groove at which element 50 was cut. A metal drift 74 may then most conveniently be applied to end surface 70 and element 50 thereby forcibly hammered into hard inner layer 40 by the application of a force indicated in FIG. 10 by the arrow "F".

As best understood with reference to FIG. 10, because the steel forming element 50 is not as hard as hard inner layer 40, and because there may be a slight chamfer 44 at the entry end of aperture 42 presented to tapered portion 52, the cut element 50 will be forcibly driven by a sufficiently large force "F" into original through-hole 42 in hard inner layer 40. Consequently, as best understood with reference to FIGS. 10-12, the difficult-to-machine solid plug 62 will be very firmly lodged inside hard inner layer 40 where it is in a position to offer the maximum interference to any attempt to drill through the length of element 50 and into hard inner layer 40. Since "machining", as the term is normally used, includes drilling, milling and grinding, the term "difficult-to-machine" is used to characterize the material as being highly resistant to all such machining techniques.

In an element of practical size, the various dimensions may be, for example, overall length $l_1 = 2.0''$, the tapered portion length $l_5 = 5/16''$, the maximum diameter $d_7 = 0.250''$, diameter $d_5 = 0.270''$, the enlarged hole diameter $d_6 = 0.300''$, the grooves $\frac{1}{8}''$ apart, and the solid plug 62 $\frac{3}{8}''$ in length and $\frac{1}{8}''$ in diameter.

Referring now to FIGS. 11 and 12, it will be easily seen how conventional welding techniques may be utilized to apply a quantity of a welding material 76 that fuses with surfaces 70 and 72 at the end of element 50 and with at least the immediately adjacent annular portion of the surface of enlarged aperture 32 adjacent the cut end surface 70.

For certain applications it may not matter that the outer uneven surface of weld material 78 is not flush and contiguously coextensive with the rest of the relatively flat visible outer surface 34 of outer layer 30. It may, however, be desirable to apply a grinding wheel, a file, or some other such tool, to generate a flat surface 80 of welded material 78 to cause it to be smoothly contiguous with surface 34 of outer layer 30. Once this is done, it should be easy to repaint the surface so that the location of plug 50 underneath surface 80 of weld 78 cannot be readily detected. This will improve the appearance of the safe and, more important, hide from a would-be burglar the location of previously formed and now closed-off hole 32, 42.

Other variations and obvious modifications of the present invention may be readily practiced by persons skilled in the art upon developing an understanding of the present invention. Grooves 54, for example, could have a curved or square cross-section. Similarly, length $l_5$ corresponding to the length of difficult-to-machine plug 62, may be made longer than the sum of the lengths $l_3$ and $l_4$, i.e., longer than the combined lengths of the ungrooved portion of element 50 and the tapered portion thereof. If this were done, any drill being used to drill out the material of element 50 from the outside of the safe would encounter the difficult-to-machine material of solid plug 62 earlier. Similarly, brazing may be utilized in place of silver soldering to attach difficult-to-machine plug 62 within blind hole 60. The number, size and cross-sectional form of grooves 54 obviously can be varied depending upon the anticipated application. Thus, a manufacturer of certain models of safes may simply provide for its users a standardized element 50 with but a single suitably located groove for each particular model. Numerous other such variations for utilizing the substance of the present invention and the method o its use will become obvious to persons of ordinary skill in the art upon developing an understanding of this invention as described hereinabove.

Similarly, although the steps comprising only the preferred method of practicing this invention are discussed in detail, persons of ordinary skill in the art upon understanding the same will undoubtedly consider obvious variations and substitutions of steps therefor. Accordingly, all such variations are intended to be comprehended within the present invention which is limited solely by the terms of the claims appended hereto.

I claim:
1. A device for securely plugging a hole comprising:
    a generally cylindrical elongate element, having a tapered insertion end shaped and sized to be securely lodged into said hole when subjected to an externally applied force, said tapered end having a blind hole therein; and
    a solid plug of a difficult-to-machine material, shaped and sized to closely fit into said blind hole, securely attached inside said blind hole,
    a portion of the length of the plug being circumferentially grooved.
2. A device for securely preventing reentry through a cylindrical hole previously made in a multi-layer wall of a safe, comprising:
    a substantially cylindrical elongate steel element of a length and a maximum outside diameter slightly smaller than a diameter of said hole in the outermost layer of the wall but slightly larger than a diameter of said hole within a hard inner layer, an insertion end portion of the element being formed to have an outside taper ending in a small diameter at a first end of said element, said first end also having formed therein a blind hole of a hole length and a hole diameter smaller than said small diameter of said element; and
    a solid plug comprising a selected difficult-to-machine material, shaped and sized to closely fit into said blind hole, said plug being securely attached to said element therein.
3. The device according to claim 2, wherein:
    said selected material of said plug comprises a metal carbide.
4. The device according to claim 3, wherein:
    said plug is securely attached inside said hole by silver soldering to the element thereat.
5. The device according to claim 2, further comprising:
    a plurality of markings provided along the length of said cylindrical element, whereby a user of the device is enabled to readily determine how much of the length of the element is inserted into the hole.
6. The device according to claim 5, wherein:

said markings comprises a plurality of grooves, formed into the cylindrical surface of said element and spaced apart at regular intervals along the length thereof.

7. The device according to claim 6, wherein:
said grooves each extend circumferentially of said element.

8. The device according to claim 7, wherein:
said circumferential grooves have a generally triangular section with inwardly sloping sides.

9. The device according to claim 8, wherein:
said selected material of said plug comprises a metal carbide.

10. The device according to claim 9, wherein:
said plug has been securely attached inside said hole by silver soldering to the element thereat.